United States Patent
Tan et al.

(10) Patent No.: US 11,644,086 B2
(45) Date of Patent: May 9, 2023

(54) VARIABLE ACCELERATION CURVED SURFACE SPIRAL GEAR TRANSMISSION MECHANISM FOR ACCELERATED OSCILLATOR DAMPER SYSTEMS

(71) Applicant: DALIAN UNIVERSITY OF TECHNOLOGY, Liaoning (CN)

(72) Inventors: Yonggang Tan, Liaoning (CN); Long Che, Liaoning (CN); Zhe Zhang, Liaoning (CN); Taifu Chen, Liaoning (CN); Kun Wen, Liaoning (CN); Kamal Azaz, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 422 days.

(21) Appl. No.: 17/041,327

(22) PCT Filed: Sep. 25, 2019

(86) PCT No.: PCT/CN2019/107682
§ 371 (c)(1),
(2) Date: Sep. 24, 2020

(87) PCT Pub. No.: WO2021/056233
PCT Pub. Date: Apr. 1, 2021

(65) Prior Publication Data
US 2021/0239191 A1  Aug. 5, 2021

(51) Int. Cl.
*F16H 3/44* (2006.01)
*E04H 9/02* (2006.01)
(Continued)

(52) U.S. Cl.
CPC ............... *F16H 3/44* (2013.01); *E04H 9/021* (2013.01); *E04H 9/0215* (2020.05); *F16H 3/42* (2013.01);
(Continued)

(58) Field of Classification Search
CPC ..... E04B 1/36; E04B 1/98; F16H 3/42; F16H 19/02
(Continued)

(56) References Cited

U.S. PATENT DOCUMENTS

| 1,158,932 A | * | 11/1915 | Kohl | ........................ E04H 9/023 52/167.6 |
| 4,807,840 A | | 2/1989 | Baker | |

(Continued)

FOREIGN PATENT DOCUMENTS

| CN | 106702885 A | 5/2017 |
| CN | 109113203 A | 1/2019 |

(Continued)

OTHER PUBLICATIONS

Yonggang Tan et al.; "Performance of accelerated oscillator dampers under seismic loading"; Advances in Mechanical Engineering. Dec. 31, 2018 (Dec. 31, 2018); (pp. 10).

*Primary Examiner* — Babajide A Demuren
(74) *Attorney, Agent, or Firm* — Muncy, Geissler, Olds & Lowe, P.C.

(57) ABSTRACT

A variable acceleration curved surface spiral gear transmission mechanism for accelerated oscillator damper damping systems is disclosed. Through the orthogonal orbit planetary gear set moving along the parallel circular arc line guide rail, the concave surface spiral gear and the convex surface spiral gear are meshed at different radii, so as to realize the continuous changing of the speed ratio and changing of the acceleration of the additional mass block. The spiral curve limit guide groove is set on the surface of concave surface spiral gear and convex surface spiral gear, and the changing rate of speed changing ratio is adjusted by designing different spiral curves, and then the acceleration changing rate of additional mass block is controlled.

1 Claim, 1 Drawing Sheet

(51) Int. Cl.
*F16H 3/42* (2006.01)
*F16H 19/02* (2006.01)
*E01D 19/00* (2006.01)
*F16H 57/023* (2012.01)

(52) U.S. Cl.
CPC ............. *F16H 19/02* (2013.01); *E01D 19/00* (2013.01); *F16H 57/023* (2013.01)

(58) Field of Classification Search
USPC .............................................. 52/167.6, 167.5
See application file for complete search history.

(56) References Cited

U.S. PATENT DOCUMENTS

| 2003/0167707 | A1* | 9/2003 | Tsai | ........................ | E04H 9/023 |
| | | | | | 52/167.6 |
| 2012/0124920 | A1* | 5/2012 | Alsaif | .................. | E04H 9/0235 |
| | | | | | 52/741.3 |
| 2012/0222369 | A1* | 9/2012 | Kemeny | ................. | E04H 9/023 |
| | | | | | 248/636 |

FOREIGN PATENT DOCUMENTS

| CN | 109695200 A | 4/2019 |
| CN | 110529567 A | 12/2019 |
| JP | 5993300 B2 | 9/2016 |

* cited by examiner

VARIABLE ACCELERATION CURVED SURFACE SPIRAL GEAR TRANSMISSION MECHANISM FOR ACCELERATED OSCILLATOR DAMPER SYSTEMS

TECHNICAL FIELD

The invention belongs to the technical field of passive control of bridge structures, and relates to the vibration reduction technology of bridges, in particular to a variable acceleration curved surface spiral gear transmission mechanism for accelerated oscillator damper systems.

BACKGROUND

During the earthquake, the longitudinal displacement of the main girder of the long-span suspension bridge is large, and the inertia force of the main girder will be transferred to the towers, which will cause the tower to bear greater bending moment. At present, the common vibration mitigation methods are as follows: (1) viscous dampers are used between the main girder and the anchorages or between the main girder and the towers; (2) Adopt isolation bearings; (3) Adopt accelerated oscillator damper system. Although the conventional tuned mass damper (TMD) has a certain damping function, its applicable frequency range is narrow, and it needs a large additional mass block, so its seismic damping effect for bridges is not obvious. Accelerated oscillator damper system has a good damping effect, but because the transmission ratio of the accelerated oscillator damper is constant. In order to reduce the structural response under the maximum earthquake force, it is necessary to design a larger transmission ratio. However, under the wind load or temperature change and other common loads, the stroke of the attached mass block is too large, which will shorten the service life of the spring and viscous damping components.

SUMMARY

The present invention provides a variable acceleration curved surface spiral gear transmission mechanism for accelerated oscillator damper system, including input gear, concave surface spiral gear, parallel arc line guide rail, orthogonal orbit planetary gear set, convex surface spiral gear, output gear and gearbox. The transmission ratio can be continuously changed, and the acceleration of the additional mass can also be adjusted. When the vibration amplitude near the initial equilibrium position of the structure is small, a smaller transmission ratio can be adopted; when the seismic displacement of the bridge structure is close to the peak value, the transmission ratio will be automatically changed to provide greater inertia damping force.

The Technical Solution of the Invention is as Follows

A variable acceleration curved surface spiral gear transmission mechanism for accelerated oscillator damper system includes input gear 1, concave surface spiral gear 2, orthogonal orbit planetary gear set 3, parallel circular arc guide rail 11, convex surface spiral gear 7, output gear 8 and gearbox housing 9, wherein orthogonal orbit planetary gear set 3 includes planetary gear set input gear 4, inter track transmission gear 5, planetary gear set output gear 6, planetary gear set bracket 10, input pinion 16 and output pinion 17. A main structure (main girder of bridge) 13 is connected with the input gear 1 through rack, the input gear 1 and the concave surface spiral gear 2 are fixed coaxial synchronous rotating gears, and the concave surface spiral gear 2 is meshed with the planetary gear set input gear 4 of the orthogonal orbit planetary gear set 3. The input pinion 16 and the planetary gear set input gear 4 are coaxial synchronous gears which are fixed together. The input pinion 16 is meshed with the inter track transmission gear 5, and the inter rail transmission gear 5 is meshed with the output pinion 17. The output pinion 17 and the output gear 6 of the planetary gear set are fixed together. The planetary gear set output gear 6 is meshed with the convex surface spiral gear 7. The convex surface spiral gear 7 and the output gear 8 are coaxial synchronous gears fixed together, and the output gear 8 is connected with the additional mass block 15 through output rack.

In the accelerated oscillator damper system, the vibration of the main structure (main girder of bridge) 13 is transmitted to the gearbox 14, which is amplified by the gearbox 14 and then transmitted to the secondary system composed of additional mass block 15, spring and viscous damper for energy dissipation; when the gearbox 14 is replaced by the variable acceleration curved surface spiral gear transmission mechanism, the vibration of the main structure (the main girder of the bridge) 13 passes through the input gear 1 and drives the concave surface spiral gear 2 to rotate, and the concave surface spiral gear 2 drives the planetary gear set input gear 4. The planetary gear set input gear 4 and the input pinion 16 are coaxial synchronous gears fixed together. Therefore, the concave surface spiral gear 2 also drives the input pinion 16 to rotate and transmits the motions to the inter track transmission gear 5, and then transmits it to the output pinion 17, the output pinion 17 and the planetary gear set output gear 6 are coaxial synchronous gears fixed together, so the motion is transmitted to the planetary gear set output gear 6, then to the convex surface spiral gear 7, and then through the output gear 8, it is passed to the additional mass block 15 with rack.

Orthogonal orbit planetary gear set 3 is a motion unit composed of planetary gear set input gear 4, input pinion 16, inter track transmission gear 5, output pinion 17, planetary gear set output gear 6, planetary gear set bracket 10 et. al, which can move freely along parallel circular arc guide rail 11. The initial position of the orthogonal orbit planetary gear set 3 is just set at the middle of the parallel circular arc guide rail 11, where the radius of concave surface spiral gear 2 is the smallest, and the convex surface spiral gear 7 is the largest, so the transmission ratio is also the minimum. When the main structure 13 vibrates, while driving the concave surface spiral gear 2 to rotate, the orthogonal orbit planetary gear set 3 moves along the parallel circular arc line guide rail 11 away from the center point, and the gear radius meshing with concave surface spiral gear 2 increases, while the gear radius meshing. with convex surface spiral gear 7 decreases, and the transmission ratio correspondingly increases. For the additional mass block 15, the far away from the equilibrium position, the greater the acceleration is, and when it returns to the near equilibrium position, the acceleration will decrease again. The track of the meshing points of the orthogonal orbit planetary gear set 3 with the concave surface spiral gear 2 and the convex surface spiral gear 7 is the spiral curve 12. Setting the limit guide groove along this curve can ensure that the spiral curve 12 is just the track line of the gear meshing point. Different spiral curves determine the changing rate of acceleration.

The effects and benefits of the invention are as follows:
1) Through the orthogonal orbit planetary gear set moving along the parallel circular arc line guide rail, the concave surface spiral gear and the convex surface spiral gear can be meshed at different radii, it can realize the continuous change of the speed ratio, so as to change the acceleration of the additional mass block.

2) The spiral curve limit guide groove can be set on the surface of concave surface spiral gear and convex surface spiral gear, and the speed of change of speed ratio can be adjusted by designing different spiral curves, and the acceleration changing rate of additional mass block can be controlled.

3) The mechanism controls the acceleration of the additional mass by adjusting the gear ratio of the gearbox. When the seismic displacement of the bridge structure is closer to the peak value, the inertial damping force provided by the mechanism is larger. When the bridge structure vibrates in a small amplitude near the equilibrium position, its variable speed ratio can be reduced, and the stroke of the additional mass block will also be reduced, which is beneficial to extend the service life of spring and viscous damper

Figure 1:
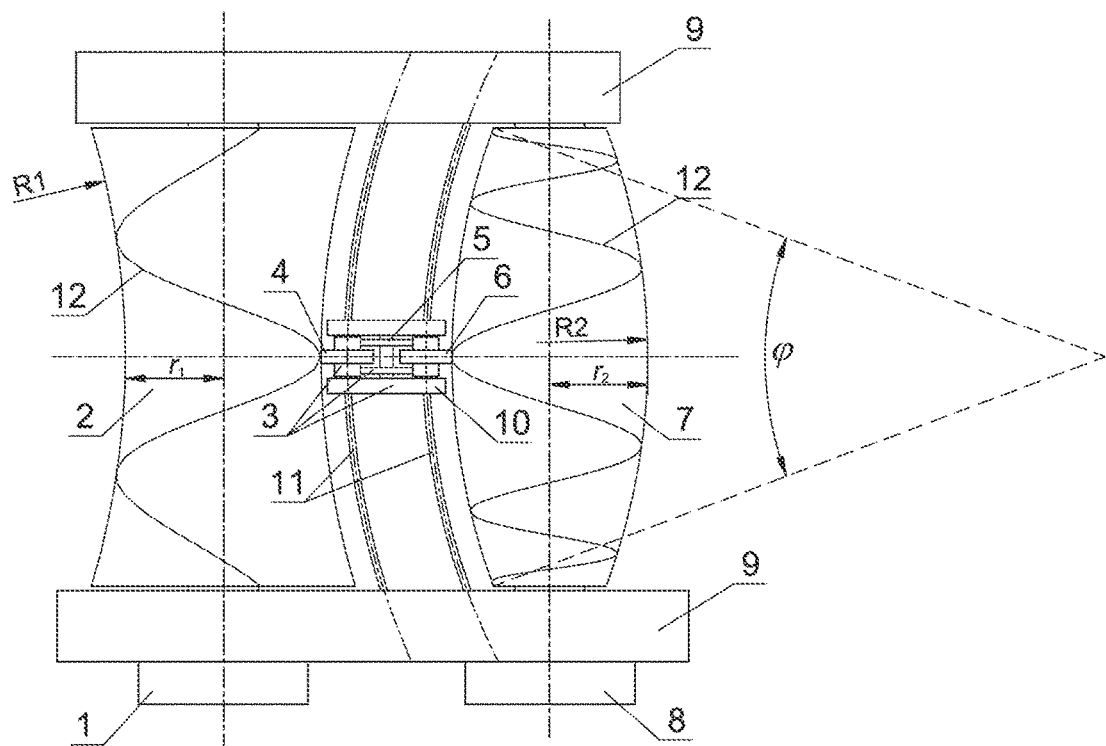
FIG. 1 is a schematic diagram of a variable acceleration curved surface spiral gear transmission mechanism for accelerated oscillator damper system.
Figure 2:
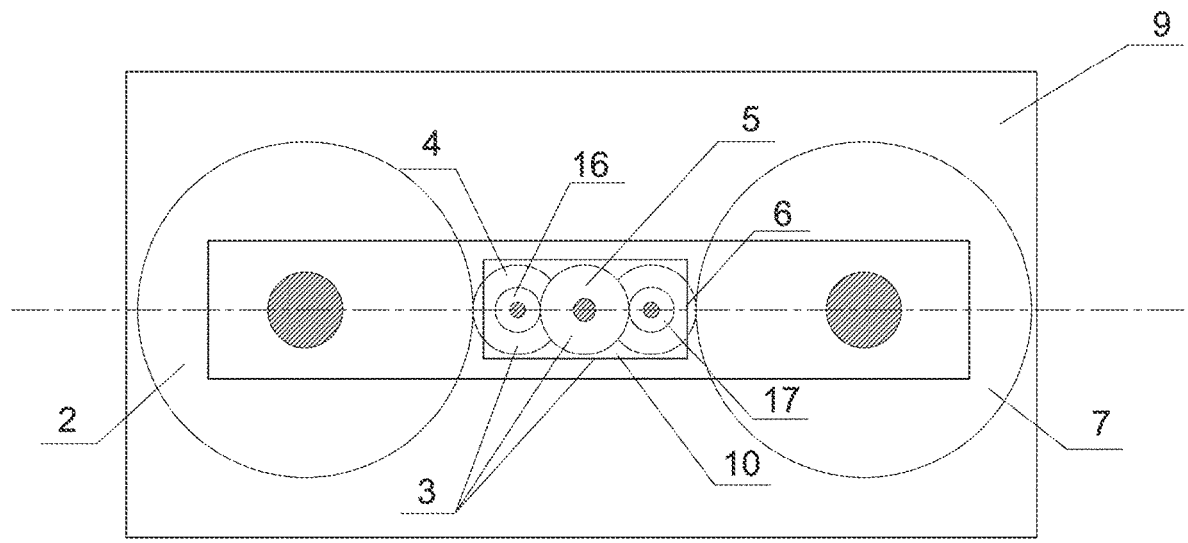
FIG. 2 is a schematic diagram of an orthogonal orbit planetary gear set.
Figure 3:
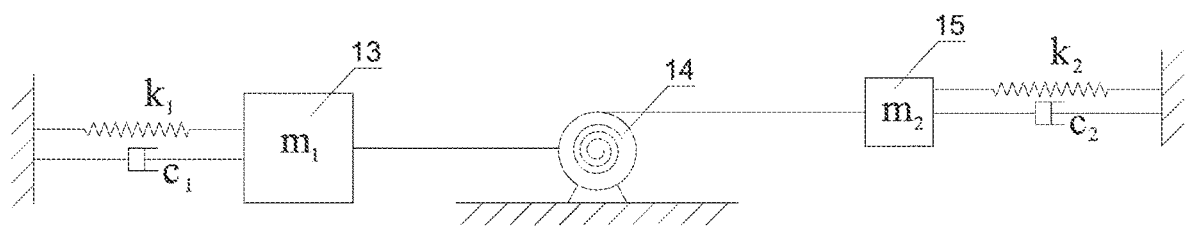
FIG. 3 is a schematic diagram of a variable speed mass damper system for bridge damping.

In the figure: 1 input gear; 2 concave surface spiral gear; 3 orthogonal orbit planetary gear set; 4 planetary gear set input gear; 5 inter track transmission gear; 6 planetary gear set output gear; 7 convex surface spiral gear; 8 output gear; 9 gearbox housing; 10 planetary gear set bracket; 11 parallel circular arc guide rail; 12 spiral curve; 13 main structure (main girder of bridge); 14 gearbox; 15 additional mass block; 16 input pinion; 17 output pinion.

DETAILED DESCRIPTION

The specific implementation approach of the invention is described in detail in combination with the technical solution and the attached drawings.

The span layout of self-anchored suspension bridge is 100+360+100 m, and the width is 24 m. The main girder is steel box girder structure. The end of the main girder 13 is connected with the input end of the gearbox 14 at the abutment, and the output end of the gearbox 14 is connected with the additional mass block 15, and the additional mass block 15 is connected with the abutment foundation through springs and viscous dampers; when the bridge is under the action of earthquakes, the vibration of the main girder 13 is transmitted to the gearbox 14; the gearbox 14 is a variable acceleration curved surface spiral gear transmission mechanism with an initial speed ratio of 1:1. As the vibration intensifies, the orthogonal orbit planetary gear set 3 moves along the parallel circular arc line guide rail 11 away from the center point, and the radius of the gear engaging with the concave surface spiral gear 2 increases, while the gear radius meshing with the convex surface spiral gear 7 decreases, and the transmission ratio correspondingly increases. When the motion is transferred to the additional mass block 15, its acceleration will also be enlarged, and the inertia damping force obtained by the system will be increased; When the bridge returns to the position close to the balance, the orthogonal orbit planetary gear set 3 will return to the center of the parallel circular arc guide rail 11, the speed ratio will also be smaller, and its acceleration will also be smaller.

The concave surface spiral gear 2 and the convex surface spiral gear 7 adopt the shape of rotating circular surface, and the parametric equations of the surfaces are as follows:

$$\begin{cases} r = R_1(1 - \cos\varphi) + r_1 \\ x = r\cos\theta \\ y = r\sin\theta \\ z = R_1\sin\varphi \end{cases}$$

$$\begin{cases} r = R_2(\cos\varphi - 1) + r_2 \\ x = r\cos\theta + R_1 - R_2 + r_1 + r_2 \\ y = r\sin\theta \\ z = R_2\sin\varphi \end{cases}$$

The parametric equations of the spiral curve on the surface are as follows:

$$\begin{cases} r = R_1(1 - \cos\varphi) + r_1 \\ x = r\cos\left(\varphi \cdot \dfrac{k}{r}\right) \\ y = r\sin\left(\varphi \cdot \dfrac{k}{r}\right) \\ z = R_1\sin\varphi \end{cases}$$

$$\begin{cases} r = R_2(\cos\varphi - 1) + r_2 \\ x = r\cos\left(\varphi \cdot \dfrac{k}{r}\right) + R_1 - R_2 + r_1 + r_2 \\ y = r\sin\left(\varphi \cdot \dfrac{k}{r}\right) \\ z = R_2\sin\varphi \end{cases}$$

where, $R_1$ and $R_2$ are the radius of rotation surface generatrix of concave surface spiral gear 2 and convex surface spiral gear 7 respectively, $r_1$ and $r_2$ are the gear radius of concave surface spiral gear 2 and convex surface spiral gear 7 at the initial position, $\varphi$ is the circular arc central angle of rotation surface generatrix, $\theta$ is the polar coordinates of rotation surface rotation angle of concave surface spiral gear 2 and convex surface spiral gear 7, and $k$ is the parameter that determines how fast the acceleration changes.

The invention claimed is:

1. A variable acceleration curved surface spiral gear transmission mechanism for accelerated oscillator damper systems, wherein the variable acceleration curved surface spiral gear transmission mechanism includes input gear (1), concave surface spiral gear (2), orthogonal orbit planetary gear set (3), parallel circular arc guide rail (11), convex surface spiral gear (7), output gear (8) and gearbox housing (9), wherein orthogonal orbit planetary gear set (3) includes planetary gear set input gear (4), inter track transmission gear (5), planetary gear set output gear (6), planetary gear set bracket (10), input pinion (16) and output pinion (17); a main structure (13) is connected with the input gear (1) through rack, the input gear (1) and the concave surface spiral gear (2) are fixed coaxial synchronous rotating gears, and the concave surface spiral gear (2) is meshed with the planetary gear set input gear (4) of the orthogonal orbit planetary gear set (3); the input pinion (16) and the planetary gear set input gear (4) are coaxial synchronous gears which are fixed together; the input pinion (16) is meshed with the inter track transmission gear (5), and the inter rail transmission gear (5) is meshed with the output pinion (17); the output pinion (17) and the planetary gear set output gear (6) are fixed together; the planetary gear set output gear (6) is meshed with the convex surface spiral gear (7); the convex surface spiral gear (7) and the output gear (8) are coaxial synchronous gears fixed together, and the output gear (8) is connected with the additional mass block (15) through output rack;

in a variable speed mass damping system, a vibration of the main structure (13) is transmitted to the gearbox (14), which is amplified by the gearbox (14) and then transmitted to a second system composed of additional mass block (15), spring and viscous damper for energy dissipation; when the gearbox (14) is replaced by the variable acceleration curved surface spiral gear transmission mechanism, the vibration of the main structure (13) passes through the input gear (1) drives the concave surface spiral gear (2) to rotate, and the concave surface spiral gear (2) drives the planetary gear set input gear (4); the planetary gear set input gear (4) and the input pinion (16) are coaxial synchronous gears fixed together; therefore, the concave surface spiral gear (2) also drives the input pinion (16) to rotate and transmits the motion to the inter track transmission gear (5), and then transmits it to the output pinion (17), the output pinion (17) and the planetary gear set output gear (6) are coaxial synchronous gears fixed together, so the motion is transmitted to the planetary gear set output gear (6), then to the convex surface spiral gear (7), and then through the output gear (8), it is passed to the additional mass block (15) with rack;

orthogonal orbit planetary gear set (3) can move freely along parallel circular arc guide rail (11); the initial position of the orthogonal orbit planetary gear set (3) is just set at the middle of the parallel circular arc guide rail (11); when the main structure (13) vibrates, driving the concave surface spiral gear (2) to rotate, the orthogonal orbit planetary gear set (3) moves along the parallel circular arc line guide rail (11) away from the center, and the gear radius meshing with concave surface spiral gear (2) increases; meshing with convex surface spiral gear (7) decreases, and the transmission ratio correspondingly increases; as for the additional mass block (15), the further away from the equilibrium position, the greater the acceleration is, and when it returns to near the equilibrium position, the acceleration will decrease again; the track of the meshing points of the orthogonal orbit planetary gear set (3) with the concave surface spiral gear (2) and the convex surface spiral gear (7) is a spiral curve (12); setting the limit guide groove along this curve can ensure that the spiral curve (12) is just the track line of the gear meshing point; different spiral curves determine the changing rate of acceleration change.

* * * * *